(No Model.) 2 Sheets—Sheet 1.

J. W. BUTLER.
MANUFACTURE OF ARTIFICIAL STONE AND APPARATUS THEREFOR.

No. 250,883. Patented Dec. 13, 1881.

WITNESSES:
D. Williams
James F. Tobin

INVENTOR:
James W. Butler
by his Attorneys.
Howson and Son (No Model.) 2 Sheets—Sheet 2.

J. W. BUTLER.
MANUFACTURE OF ARTIFICIAL STONE AND APPARATUS THEREFOR.

No. 250,883. Patented Dec. 13, 1881.

WITNESSES:
D. Williams
James F Tobin

INVENTOR
James W. Butler
by his attorneys
Howson and Son

UNITED STATES PATENT OFFICE.

JAMES WILLIAM BUTLER, OF BLACKHEATH, COUNTY OF KENT, ENGLAND.

MANUFACTURE OF ARTIFICIAL STONE AND APPARATUS THEREFOR.

SPECIFICATION forming part of Letters Patent No. 250,883, dated December 13, 1881.

Application filed June 27, 1881. (No model.) Patented in England September 18, 1877.

*To all whom it may concern:*

Be it known that I, JAMES WILLIAM BUTLER, a subject of the Queen of Great Britain and Ireland, and a resident of Blackheath, in the county of Kent, England, have invented certain Improvements in the Manufacture of Artificial Stone and Apparatus Therefor, (for which British Letters Patent were granted to myself and James Hodges September 18, 1877, No. 3,509,) of which the following is a specification.

My invention relates to the production of paving-slabs, blocks, pipes, emery-wheels, grindstones, and other articles from plastic materials; and it consists of improvements in the machinery or apparatus employed in performing that operation.

In carrying out my invention I prepare any suitable cement—such, for example, as Portland cement—and introduce the material or composition so prepared into open molds placed (previously to the introduction of the material thereinto) upon a table which I term a "trembling-table"—that is to say, one to which a vertical shaking or tremulous motion is imparted. The table, which, by preference, rests upon and is connected to a frame so as to be free to move vertically, is alternately lifted from and allowed to fall upon its support, so as to produce a tremulous action upon the mold, whereby the material therein is condensed as it is supplied to the mold without the necessity for tamping or ramming, or for any other manipulation than the smoothing of the surface by means of a trowel or similar instrument.

Figure 1:
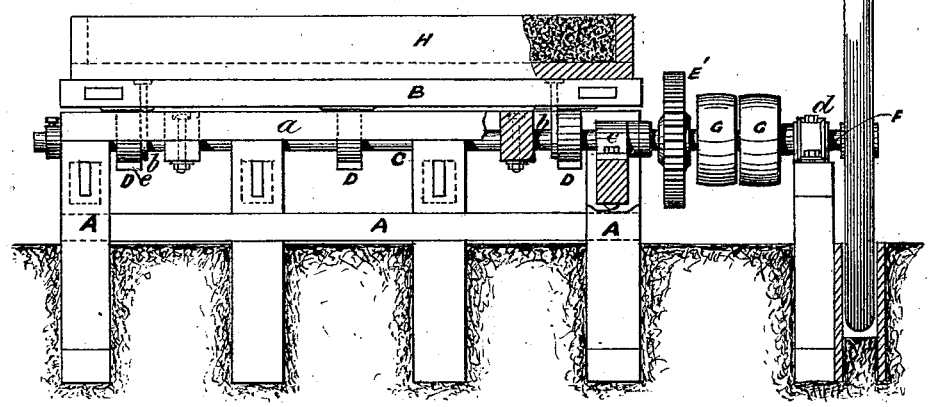
Figure 2:
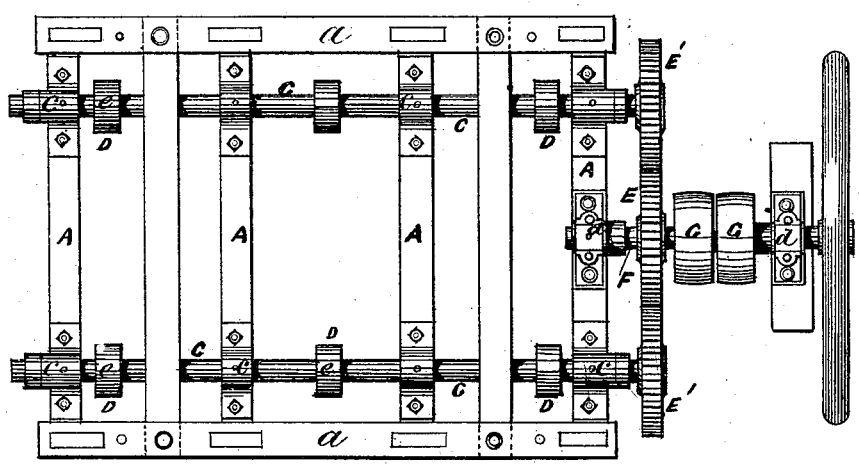
Figure 3:
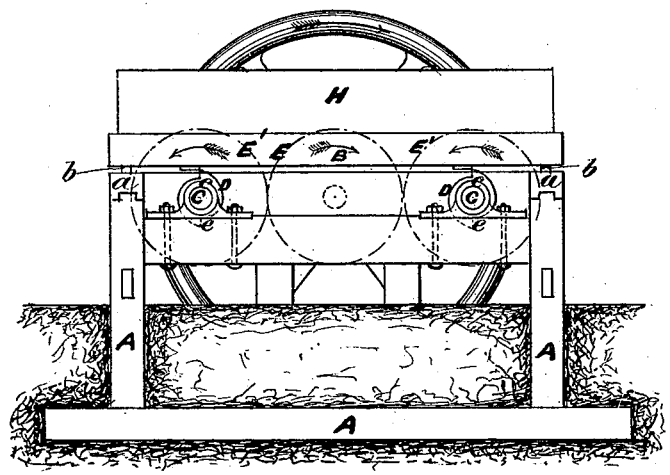

In the accompanying drawings, Figure 1 represents a longitudinal sectional elevation of a machine for molding paving-slabs, constructed according to my invention; Fig. 2, a plan of the same with the table and mold removed; and Fig. 3, an end elevation corresponding to Fig. 1.

A is the frame of the machine, which is made of a length and width adapted to the dimensions of the paving-slabs to be produced, and is formed horizontal on its upper surface, $a$, for the reception of the trembling-table B, which constitues an important feature of my invention. This table is connected to the frame A by means of bolts $b$, carried by the table and passing through apertures in the frame, so that while they retain the table in position laterally and endwise they admit of its alternately rising from and falling upon its support $a$. This motion of the table may be obtained in various ways, but the arrangement shown in the drawings is preferred.

C C are longitudinal shafts, mounted in bearings $c\ c$ in the frame A, and each shaft carries a series of cams, D D, for acting upon the under side of the table. These shafts are driven in the directions indicated by the corresponding arrows in Fig. 3 through the intervention of gearing E E′ E′ from a main shaft, F, mounted in bearings $d\ d$ and carrying driving-pulleys G G, for receiving motion from any suitable prime mover.

The operation of making paving-slabs with the improved apparatus is carried out in the following manner, viz: I provide a number of open molds of dimensions corresponding to those of the slabs to be produced. One of the molds is placed upon the table B, as shown at H, and the cement—such, for example, as Portland cement—having been prepared, the machine is set in motion. I then introduce the material or composition so prepared into the mold H. Under the action of the cams D D the table B alternately rises and falls, it being elevated by the portions $e\ e$ of the cams, and suddenly allowed to fall again onto the support $a$ as soon as, by the continued rotation of the shafts C C, the portions $e\ e$ have passed out of the range of the under side of the table. By these means a tremulous motion is imparted to the mold H on the table B, whereby the material is condensed as it is supplied to the mold without the necessity for tamping or ramming, or for any other manipulation than the smoothing of the surface by a trowel or similar instrument. As soon as the mold is completely full it is removed from the table B and allowed to stand for a sufficient period for the slab to set and harden; and its place having been supplied by another similar mold, the operation is repeated, and so on in succession.

When it is required to produce pipes, emery-wheels, grindstones, and other articles from plastic materials I proceed in a similar manner, the cement composition or materials, as well as the shape of the mold employed, being varied according to the nature of the article which it is required to obtain.

I claim as my invention—

The combination of a frame, A, and table B, having guide-rods b, with shafts C, and cams for imparting a shaking motion to the table, substantially as set forth.

In testimony whereof I have signed my name to this specification in the presence of two subscribing witnesses.

JAMES WILLIAM BUTLER.

Witnesses:
JAMES F. TOBIN,
HUBERT HOWSON.